United States Patent [19]

Aspenwall

[11] Patent Number: 5,503,471
[45] Date of Patent: Apr. 2, 1996

[54] ADJUSTABLE SHELF SUPPORT SYSTEM FOR SHOWCASES AND THE LIKE

[75] Inventor: John E. Aspenwall, Lehi, Utah

[73] Assignee: Jahabow Industries, Inc., Owensville, Mo.

[21] Appl. No.: 264,366

[22] Filed: Jun. 23, 1994

[51] Int. Cl.⁶ ........................................... A47F 3/12
[52] U.S. Cl. ................... 312/140; 312/114; 403/255; 403/252
[58] Field of Search ...................... 312/114, 140, 312/257.1, 263, 265.5, 351; 211/187; 52/36.1, 36.4, 36.5, 771; 108/172; 403/252, 254, 255, 261

[56] References Cited

U.S. PATENT DOCUMENTS

| | | | |
|---|---|---|---|
| 3,867,048 | 2/1975 | Endzweig | 403/255 X |
| 4,126,364 | 11/1978 | Reilly | 312/140 |
| 4,653,652 | 3/1987 | Avati | 312/140 X |
| 4,731,973 | 3/1988 | Stenemann | 312/140 X |
| 4,994,943 | 2/1991 | Aspenwall . | |
| 5,234,267 | 8/1993 | Pauer et al. | 312/140 |
| 5,301,482 | 4/1994 | Aspenwall . | |
| 5,310,298 | 5/1994 | Hwang | 403/252 X |

FOREIGN PATENT DOCUMENTS 2319842  2/1977  France .

Primary Examiner—Peter M. Cuomo
Assistant Examiner—James O. Hansen
Attorney, Agent, or Firm—M. Reid Russell

[57] ABSTRACT

An adjustable shelf support system for display cases and showcases for containing articles for display. The system includes a plurality of individual pins that are each for adjustable mounting onto a showcase vertical support whereto showcase walls are maintained, each pin to extend into the showcase, at a right angle to the vertical support. Each vertical support includes a longitudinal slot formed therein that has a keyhole cross section the longitudinal slot to receive a head end of the pin fitted to travel therein, which pin head end is an end of a threaded shaft to extend through a narrow section of the slot, at a right angle, into the showcase. A sleeve, that has a smooth wall center longitudinal passage formed therethrough, is disposed over the threaded shaft, and a cylinder, that includes a threaded center longitudinal passage formed therethrough, is arranged for turning onto the threaded shaft. The cylinder is to urge the sleeve along the threaded shaft to where a sleeve forward end will engage and bind against the vertical support along the slot, locking thereto. In practice, a plurality of pins are each positioned and secured at a like height along the vertical supports for maintaining corners and/or edges of a showcase shelf positioned thereon.

5 Claims, 2 Drawing Sheets

ADJUSTABLE SHELF SUPPORT SYSTEM FOR SHOWCASES AND THE LIKE

BACKGROUND OF THE INVENTION

1. Field of the Invention

This invention relates to adjustable shelving support arrangements for inclusion with showcases, and the like, that generally include glass panel walls supported between upright narrow vertical members that shelving support members extend from for supporting at least one shelf, or the like.

2. Prior Art

Display cases or showcases that include glass front, side and even rear walls that are arranged to prominently and attractively display products contained therein are common, particularly in a retail setting. Such showcases are free standing, are arranged to be supported onto a wall surface, can be supported on braces between piers, or the like. With such showcases a need to provide attractive and unobtrusive supports for maintaining shelves positioned thereon is a major consideration. The present invention addresses and solves this problem with a pin support system that is height adjustable where each pin can be locked in place so as to extend at a right angle from a showcase vertical support. Which vertical supports are also arranged to maintain glass panels secured thereto that are the showcase walls.

Heretofore, shelf supports for arrangement across a showcase interior have generally been provided as an arrangement of cantilever mounted brackets each having an end for fitting and locking into a slot or slots that have been formed at spaced intervals along vertical shelf support strips, the brackets are for maintaining an end edge or midsection of a shelf positioned thereon. An earlier patent of the inventor, U.S. Pat. No. 4,994,943 shows an example of cantilevered light mounting that includes brackets that have heretofore commonly been used for supporting shelves in a showcase. Additionally, beams that are maintained across vertical supports, arranged within a showcase, for supporting a showcase are shown in another earlier patent of the inventor, U.S. Pat. No. 5,301,482. Further, a clip arrangement for mounting horizontal to vertical members, to form a cabinet, is shown in a French Patent, No. 2,319,842. None of which beam, truss, or clip arrangements, however, are like or function as does the height adjustable pin support system of the invention.

BRIEF SUMMARY OF THE INVENTION

It is a principal object of the present invention in an adjustable shelf support system to provide a plurality of posts and arrangement for mounting each to extend outwardly from an interior surface of one of a plurality of spaced vertical supports of a display case or showcase that also support glass panels as the showcase walls, the plurality of mounted posts for supporting a flat shelf at its corners or at points along its edges.

Another object of the present invention is to provide, as an arrangement for adjustably mounting a plurality of posts each to extend outwardly at approximately a right angle from a vertical support that is formed as a straight extrusion and provides for receiving a foot end of a post that is positioned to slide along the vertical support, and includes an arrangement for drawing that post foot into binding engagement with the vertical support.

Another object of the present invention is to provide, as the post foot a center longitudinal slot formed in the vertical support a straight bolt that has a head end, arranged for fitting into and sliding along the bolt for fitting through a smooth wall longitudinal hole formed in a sleeve a straight threaded cylinder for turning onto the bolt, which cylinder turning urges an end thereof against the sleeve end towards the bolt head end, sandwiching the vertical support slot edge therebetween to lock the post onto, to extend into the cabinet from, the vertical support.

Still another object of the present invention is to form, on the sleeve end opposite to the bolt head undersurface, a narrow centered lending edge with sides that slope outwardly into the sleeve outer surface, a leaded end edge to fit into the vertical section slot with the sloping sides to engage the outer surfaces of the vertical support, along the slot.

Still another object of the present invention is to provide a showcase shelf mounting arrangement consisting of a plurality of pins that are each arranged to slide along one of a plurality of showcase vertical supports to a selected location therealong and can be releasable maintained at that selected location to maintain a straight flat showcase shelf positioned thereon.

In accordance with the above objects, the adjustable shelf support system of the invention is preferably for use for supporting a flat shelf that is arranged horizontally across the interior of a showcase, and is suitable for use in a retail store setting. The adjustable support system includes a plurality of individual pins, each pin having a foot end that is arranged for fitting into and sliding within a longitudinal slot formed in a vertical support. The showcase is formed by mounting, in spaced parallel arrangement, a plurality of vertical supports between showcase bottom and top sections. The vertical supports are preferably extrusions, each having the center longitudinal passage formed therein between side sections that are each for mounting an edge of glass panels, forming the showcase walls. The vertical support longitudinal slots to accommodate the edges of the post foot end, fitted in to slide therealong to a selected vertical location.

To maintain a post at a selected vertical location along a vertical support, the foot end preferably includes a bolt having a head end that is formed to fit within and travel along a cylindrical open area of the vertical support slot the slot the edges of which head are of greater diameter than the slot width. The bolt includes a straight threaded body that is of a diameter to fit through the slot center longitudinal passage and receives a sleeve fitted thereover and receives a cylinder that includes a threaded longitudinal interior passage turned thereover. The cylinder preferably includes a slot formed across a top or head end thereof for receiving a turning tool end, such as an end of a screw driver blade, to turn the cylinder onto the foot end threaded section. The cylinder end that engages the sleeve to urge a sleeve end into the vertical support slot. The sleeve end preferably includes a narrow center edge that is urged towards the bolt head undersurface, the sleeve end edge urged against the vertical support slot edges thereby releasably locking the post onto the vertical support.

The post when mounted extends at approximately a right angle from the vertical supporting, and each post is for support a corner or edge of a flat showcase shelf resting thereon. Preferably, to increase the surface area of the forward sleeve end that engages the vertical support, the forward sleeve end is preferably formed with sides that slope outwardly from sleeve narrow center edge to the sleeve outer surface, the sides to contact the vertical support surfaces separated by the slot. To maximize increasing the areas of the contacting surfaces, the sides may be carved to fit closely against the vertical support surfaces separated by the slot.

Other objects and features of the invention will become apparent from the following detailed description in conjunction with the drawings disclosing what is presently contemplated as being the best mode of the invention.

DESCRIPTION OF THE DRAWINGS

In the drawings that illustrate that which is presently regarded as the best mode for carrying out the invention.

DETAILED DESCRIPTION

Figure 1:
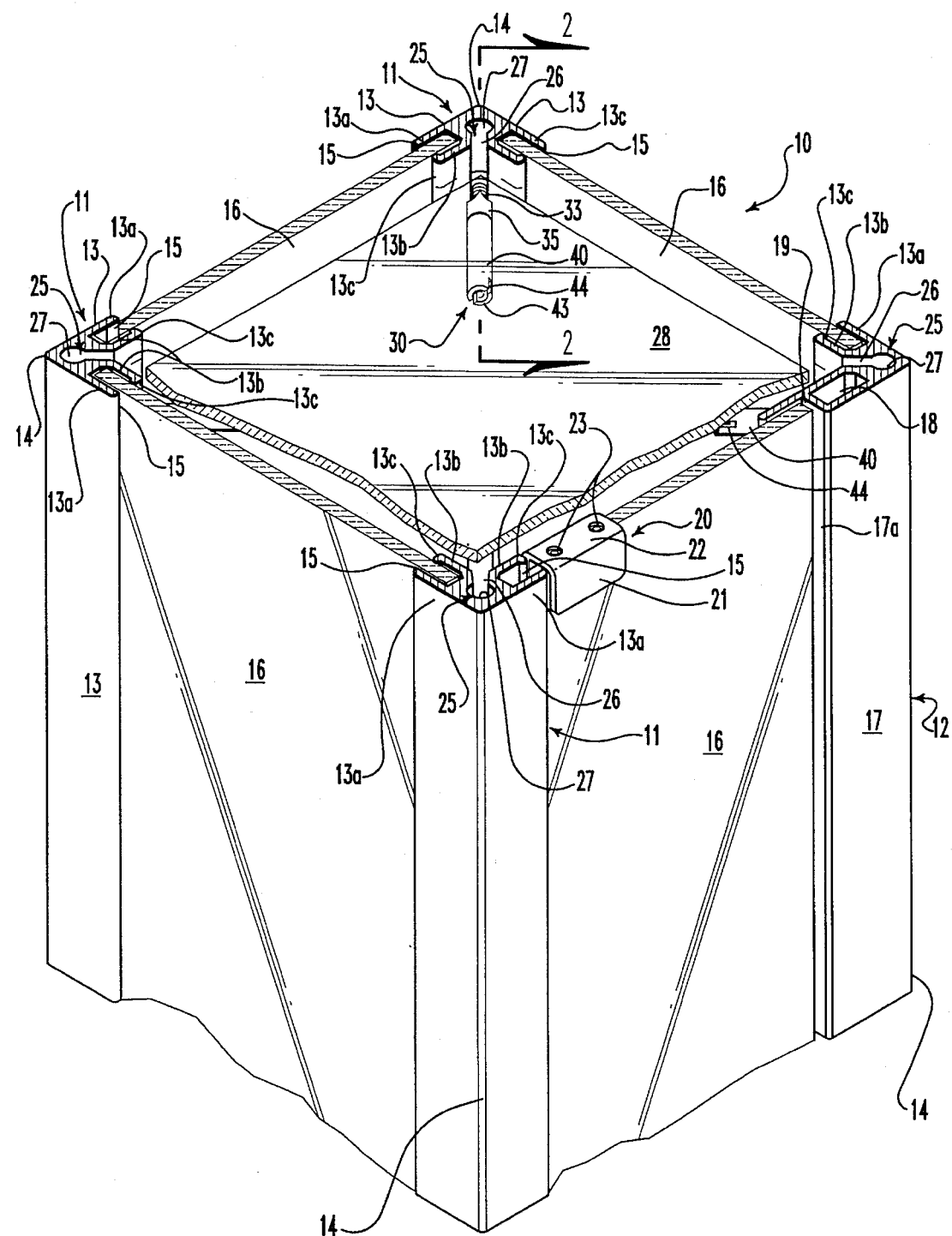
FIG. 1 is a profile perspective view taken from the top of a showcase that includes an adjustable shelf support system of the invention shown as a plurality of posts, each extending at a right angle outwardly from showcase vertical support members, the system supporting a flat shelf maintained across the showcase interior.

A section of a display case or showcase 10, hereinafter referred to as showcase, that incorporated an adjustable shelf support system of the invention is shown in FIG. 1. The showcase 10 includes vertical support members 11 and 12, each hereinafter referred to as a vertical support, that are each preferably formed as a single unit by extrusion methods from a light weight metal material such as aluminum. The vertical supports 11 and 12 are arranged parallel to one another and are spaced apart as corners of the showcase. The showcase 10 is shown as having a rectangular shape, though another shape of showcase could be employed, such as one having a triangular or octagon cross section, or the like, within the scope of this disclosure. The vertical supports 11 each have outstanding sides 13 that are the mirror images of one another and are connected at right angles along a common edge 14. The sides 13 are each slotted longitudinally at 15 leaving a straight forward or outer wall 13a and parallel back or rear wall 13b. The walls 13a and 13b are spaced apart appropriately to accommodate an edge of a glass pane 16 fitted therebetween as a showcase wall. To facilitate maintaining the glass pane 16 in place, the back wall 13b preferably includes a ridge 13c that is formed the length thereof, adjacent to the wall end and opposite to the inner surface of the forward wall 13a. Which ridge 13c is for engaging and maintaining the edge of glass pane 16 fitted between walls 13a and 13b. As shown, the vertical supports 11 provide for mounting the showcase walls.

The vertical support 12 is like vertical supports 11 in that it also includes side 13 that has slot 15 formed longitudinally therein leaving parallel forward and back walls, 13a and 13b, respectively. The back wall 13b includes ridge 13c formed therealong to contact and maintain an edge of glass pane 16. Another side 17 of which vertical support 12, however, is preferably not slotted. Rather, it is open at 18 to provide a square tube that extends the length thereof and can receive wiring, or the like, not shown, fitted therethrough. Further, the side 17 includes a back wall 19 along the length thereof and extends beyond and perpendicular to end wall 17a the back wall 19 is a stop whereagainst an edge of panel 16, that is shown as a door, is closed against. The pane 16 that is arranged as a showcase door, in addition to having an edge that contacts back wall 19, is mounted to a hinge 20. Hinge 20 allows panel 16 to pivot, providing access into showcase 10. Hinge 20, as shown in FIG. 1, is preferably a top hinge of a pair of top and bottom hinges that are each formed to have parallel sides 21. The hinge sides are arranged to straddle the glass pane edges with a hinge web 22 extending thereacross. Each hinge includes a pair of holes formed through the web that are each for receiving a fastener 23 fitted therethrough for mounting the glass pane edge. Hinges 20 each include a pivot, not shown, that is for fitting, respectively, into a hole formed in a top or a bottom plate of the showcase 10, providing a pivot mounting of the glass pane 16 to function as a showcase door.

The showcase 10 is shown in FIG. 1 as having a rectangular shape. As set out above, it should be understood that the showcase can be of another shape or have other number of sides within the scope of this disclosure. Such other arrangement would require only a modification of the vertical supports 11 and 12 to where the sides 13 and 17, respectively, are formed to intersect at 14 at an angle or greater or lesser than ninety (90) degrees, as appropriate. Also, while the vertical support 12 is shown as including a continuous center opening 18 formed in the edge of side 17 for use as a wiring conduit, or the like, it should be understood that the invention is not limited to a vertical support member that has a center opening.

For the invention, each vertical support 11 and 12 includes a slot 25 formed into the junction 14 between the vertical support sides 13 and 17. The slot 25 extends the length of the vertical support and separates the back walls 13b and 19. The slot 25 includes a straight open rectangular section 26 that is formed with parallel walls extending from the inner face of the vertical support to open into a cylindrical hole 27 adjacent to junction 14, and has a greater diameter than does the slot straight open rectangular section 26. A cross section of the slot 25 has a keyhole appearance. Each of the slots 25 are for receiving a pin 30 of an adjustable shelf support system 29 of the invention that is for supporting a corner or edge of a horizontal shelf 28 resting thereon.

Figure 2:
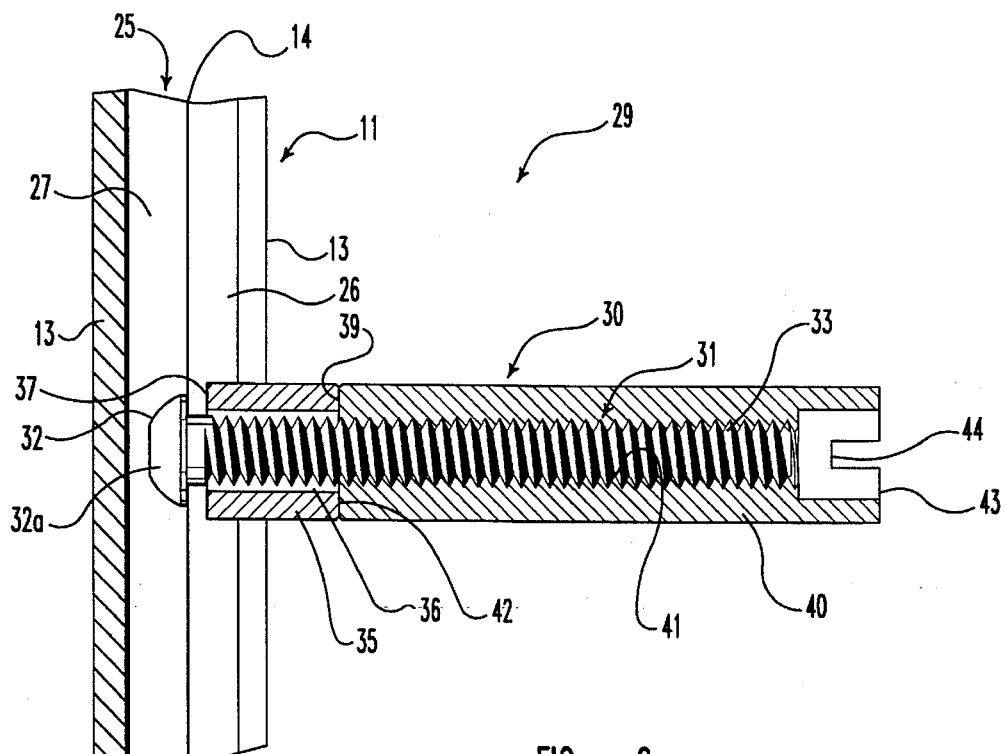
FIG. 2 is an enlarged profile sectional view taken along the line 2—2 of FIG. 1, showing a longitudinal cross section of the post that is maintained to extend outwardly from the showcase vertical support member.
Figure 3:
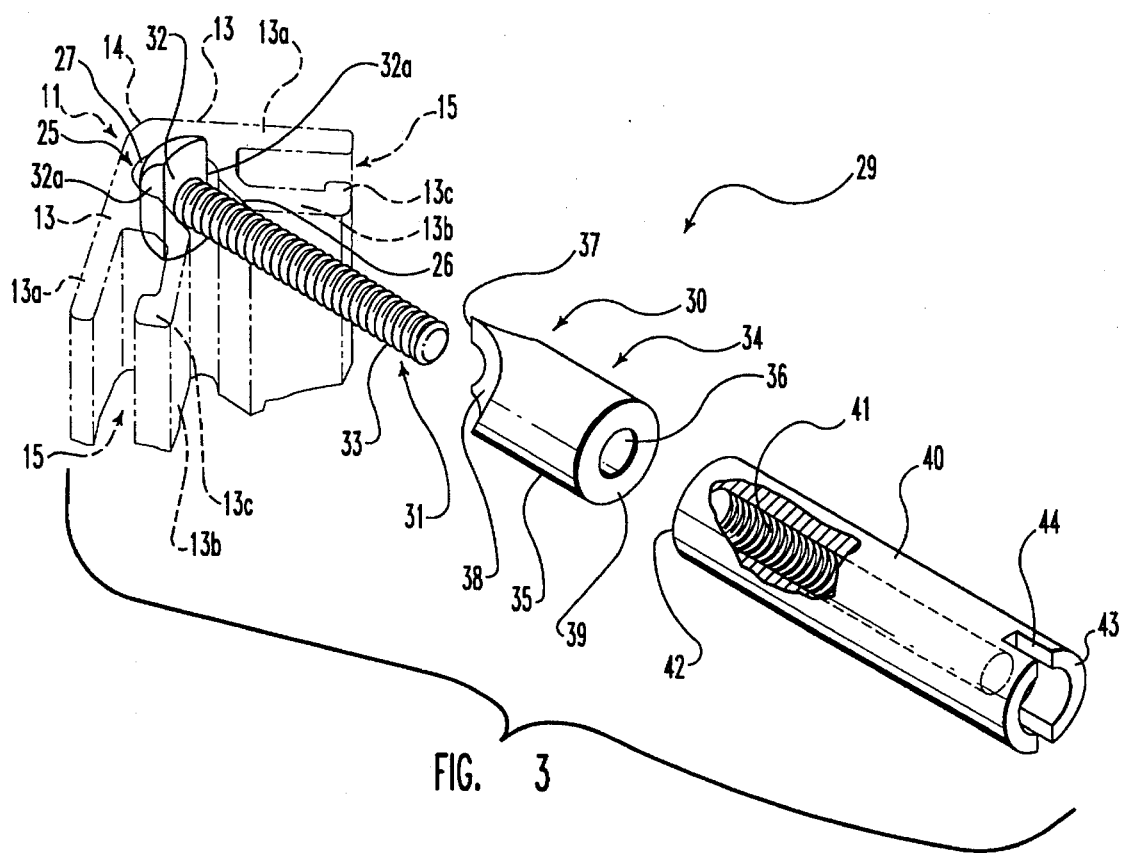
FIG. 3 is an exploded view of the post of FIGS. 1 and 2 showing the showcase vertical support in broken lines and showing a section of a cylinder of the post broken away, exposing a threaded longitudinal passage formed therein.

Pin 30 of the adjustable shelf support system 29 of the invention is shown in the expanded and exploded views of FIGS. 2 and 3, respectively. Shown therein, the slot 25 cylindrical hole 27 receives a head end 32 of a bolt 31 fitted into, to slide freely therealong, with a straight threaded bolt body 33 for fitting through to travel along the slot 25 rectangular section 26. To facilitate the bolt head end 32 sliding freely within the slot cylindrical area 27, opposite arcuate sections of the head end are preferably removed, or the head is formed to have parallel sides. Preferably, parallel sides 32a of head end 32 have a greater diameter or are separate by a distance that is greater than the distance between the walls of the slot rectangular section 26.

As set out above, the individual pin 30 bolt 31 is disposed with its head end 32 to slide along the slot cylindrical hole 27, and is maintained at a right angle to and extending from the individual support member 11 or 12. To complete pin 30, to where it can provide a rest for supporting a corner or edge of shelf 28, a sleeve 34 that has a smooth outer cylindrical body 35 and a smooth walled center longitudinal passage 36, is disposed over the bolt threaded body 33. In which arrangement a sleeve forward end that includes a narrow center edge 37 and having sides 38 slopping therefrom to intersect the cylindrical body 35, is provided for engaging the vertical support 11 or 12. The edge 37 and sloping sides 38 are formed to have a shape similar to the bow of a water going ship.

With the sleeve disposed to travel along the bolt threaded body 33, the sleeve narrow center edge 37, aligned parallel to the slot 25, will travel into the slot rectangular section 26 to where the sleeve sides 38 contact the opposing edges of the vertical support sides 13 and 17. Which opposing edges, as shown in FIGS. 1 and 3, are preferably curved, with that curve shown reproduced in the cylindrical body sloping sides 38. A snug engagement of the contacting surfaces is thereby provided to lock the pin 30 onto a vertical support. Of course, if the vertical support opposing edges were formed to be flat, or more curved than shown in FIG. 3, then the shapes of the body sloping sides 38 could be modified accordingly, to provide for a close fit of the opposing surfaces.

To urge the sleeve 34 narrow center edge 37 into the vertical support slot 25, the sleeve is provided with a flat rear end 39 that is engaged by a flat forward end 42 of a straight cylinder 40. The cylinder 40 is shown to include a threaded center longitudinal opening 41 formed therethrough for turning into the threaded body 33 of bolt 31. Turning of which cylinder 40 onto the bolt threaded body 33 provides for urging the sleeve 34 towards the vertical support 11 or 12 mounting the pin 30 at a right angle onto the vertical support. A plurality of pins 30, of course, make up the adjustable shelf support system 29 of the invention.

To provide for cylinder 40 turning onto bolt threaded body 33, a cylinder 40 rear end 43 is preferably slotted thereacross, shown as slot 44. The slot 44 is for receiving a tool, such as a screw driver, not shown, for turning the cylinder 40 so as to urge the sleeve 34 against the vertical support 11 or 12, securing the pin 30 at a right angle thereto. Which mounting is at a selected location along the vertical support as determined by sliding the bolt head 32 along slot 25 wherein it is disposed prior to turning the cylinder 40 end 42 against the sleeve 34 end 39, as described.

A preferred arrangement of pin 30 sleeve 34 and cylinder 40 for mounting to bolt 31 with a plurality of pins 30 makes up the adjustable shelf support system 29 of the invention, as shown and described herein. It should, however, be understood that other configurations of sleeve and cylinder, such as ones having triangular, square or rectangular cross sections, could be adopted for use within the scope of this disclosure. Also, where a preferred head end 32 of bolt 31 has been shown and described, it should be understood that, within the scope of this disclosure, another configuration or shape of head end 32 could be used so long as the selected shape of the head end will slide freely within the slot 25 cylindrical hole 27 and not pull out through the slot 25 rectangular section 26.

Although a preferred form of my invention in an adjustable shelf support system for showcases and the like has been shown and described herein, it should be understood that the present disclosure is made by way of example only and that variations are possible without departing from the subject matter coming within the scope of the following claims, and a reasonable equivalency thereof, which subject matter I regard as my invention.

I claim:

1. An adjustable shelf support system for showcases comprising: a plurality of straight vertical support members arranged for connection between showcase top and bottom panels and for mounting showcase walls therebetween, said vertical support members include a longitudinal slot that is adapted to face inwardly into a showcase, said slot having a narrow cross section and is of greater diameter within said vertical support member than its width at its opening therefrom; bolt means having a straight body with a head formed on one end that is formed for fitting in, to slide along, said longitudinal slot, said head having a width that is greater than the width of said longitudinal slot opening; a straight sleeve means having a smooth walled longitudinal passage formed therethrough for fitting over said bolt means straight body and includes a forward end that is arranged for engaging said vertical support member along said longitudinal slot; and means for coupling to said bolt means straight body to engage a rear end of said sleeve for urging said sleeve forward end against said vertical support member.

2. An adjustable shelf support system for showcases as recited in claim 1, wherein the bolt means straight body is threaded; and the means for coupling to said bolt means straight body for urging said sleeve forward end against said vertical support member is a straight section of material that has a center threaded longitudinal passage formed therethrough for turning onto said bolt means straight threaded body to engage a rear end of the sleeve means.

3. An adjustable shelf support system for showcases as recited in claim 2, wherein the straight section of material is a cylinder and said cylinder includes a slot formed across a rear end thereof for receiving a turning tool fitted therein.

4. An adjustable shelf support system for showcases as recited in claim 1, wherein the sleeve means forward end tapers outwardly from a centered straight leading edge formed thereacross wherefrom identical sides slope outwardly to intersect a cylindrical body of said sleeve means.

5. An adjustable shelf support system for showcases as recited in claim 4, wherein the identical sides are each formed to be concave inwardly from the leading edge to the intersection with the sleeve means cylindrical body.

\* \* \* \* \*